Figure 10:
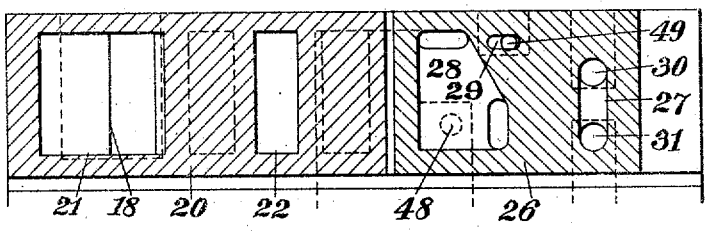

No. 12,047. Reissued Oct. 28, 1902.
J. E. NORMAND.
AIR BRAKE.
(Application filed Nov. 23, 1900.)
4 Sheets—Sheet 1
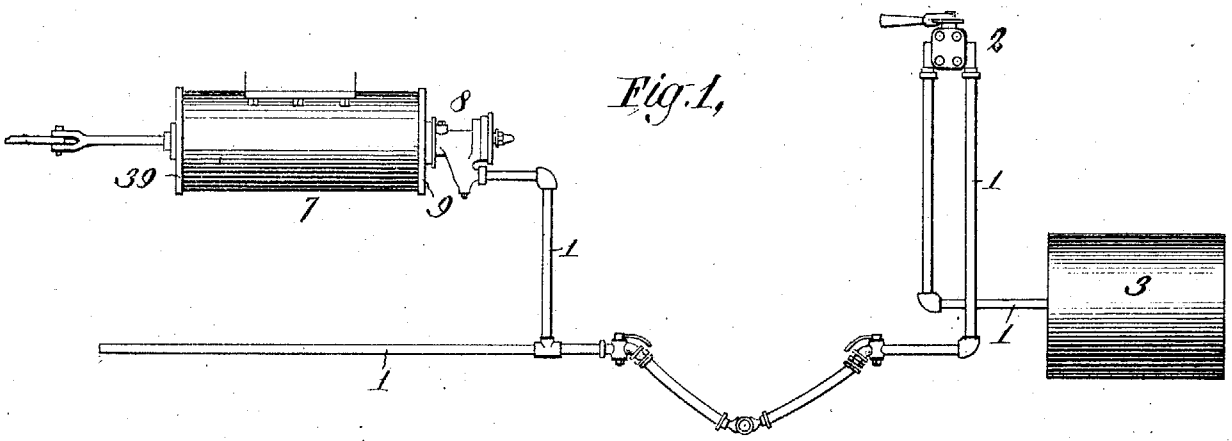
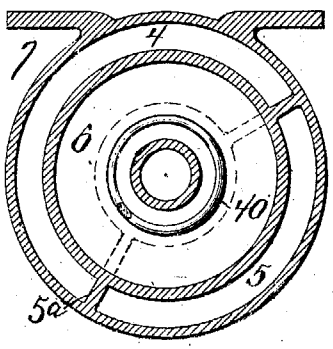
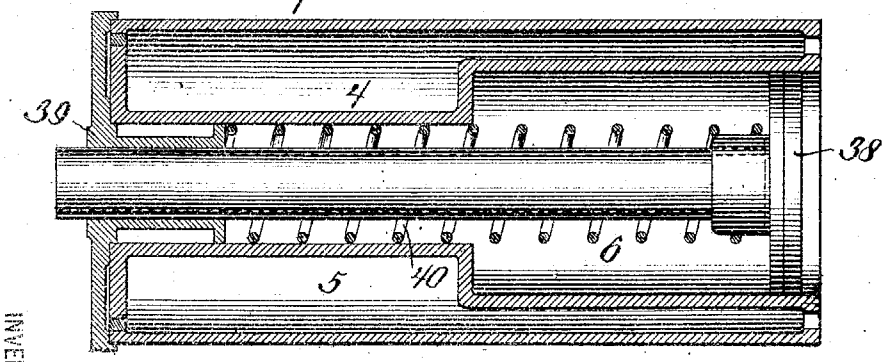
WITNESSES:
Chas. S. Ewell.
C. F. Carrington.
INVENTOR
Joseph E. Normand
BY
J. E. Chapin
His ATTORNEY No. 12,047 Reissued Oct. 28, 1902.
J. E. NORMAND.
AIR BRAKE.
(Application filed Nov. 23, 1900.)
4 Sheets—Sheet 2.
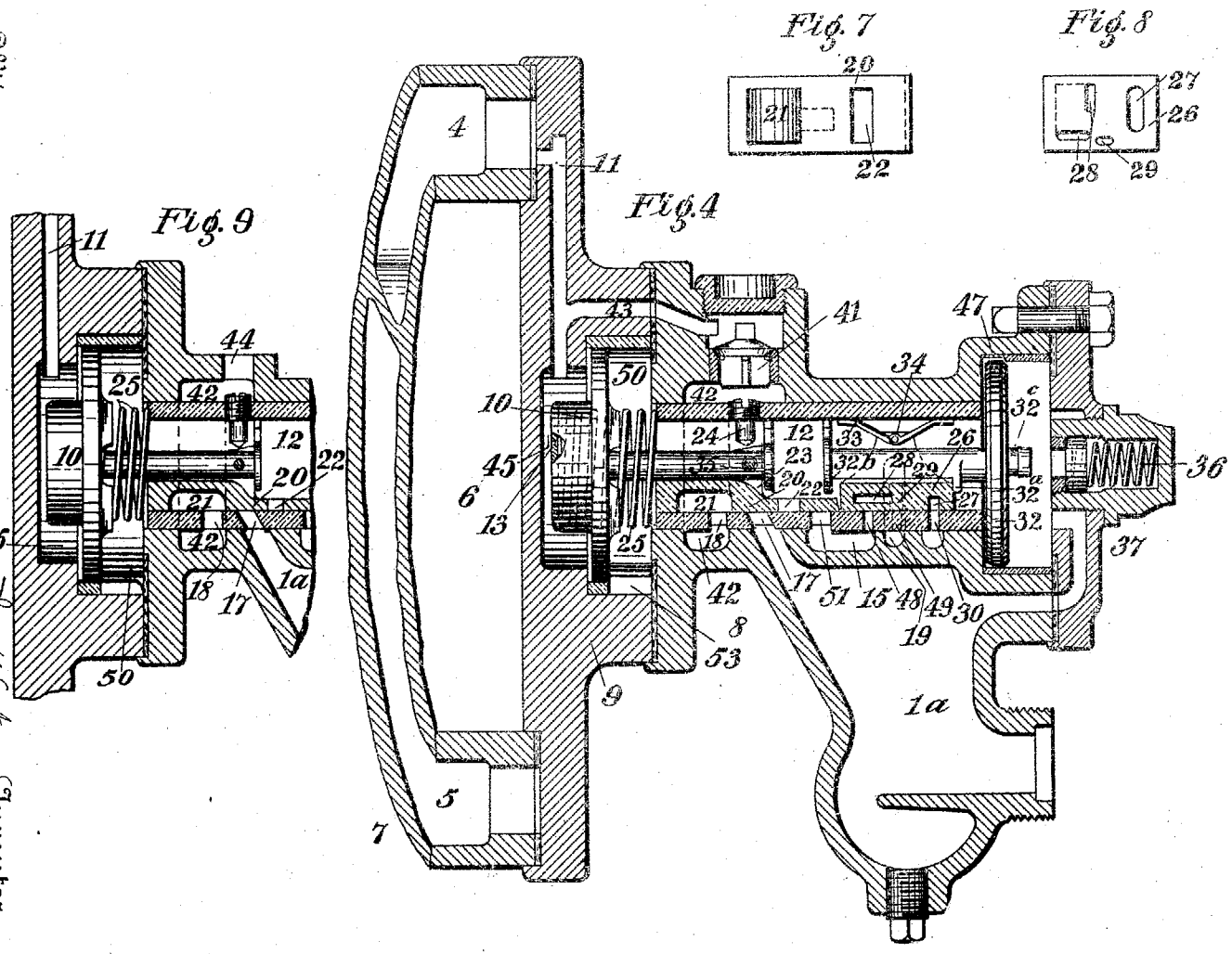
Witnesses
Chas. E. Earll
C. F. Carrington
Joseph E. Normand Inventor
By his Attorney J. E. Chapin No. 12,047. Reissued Oct. 28, 1902.
J. E. NORMAND.
AIR BRAKE.
(Application filed Nov. 23, 1900.)
4 Sheets—Sheet 3.
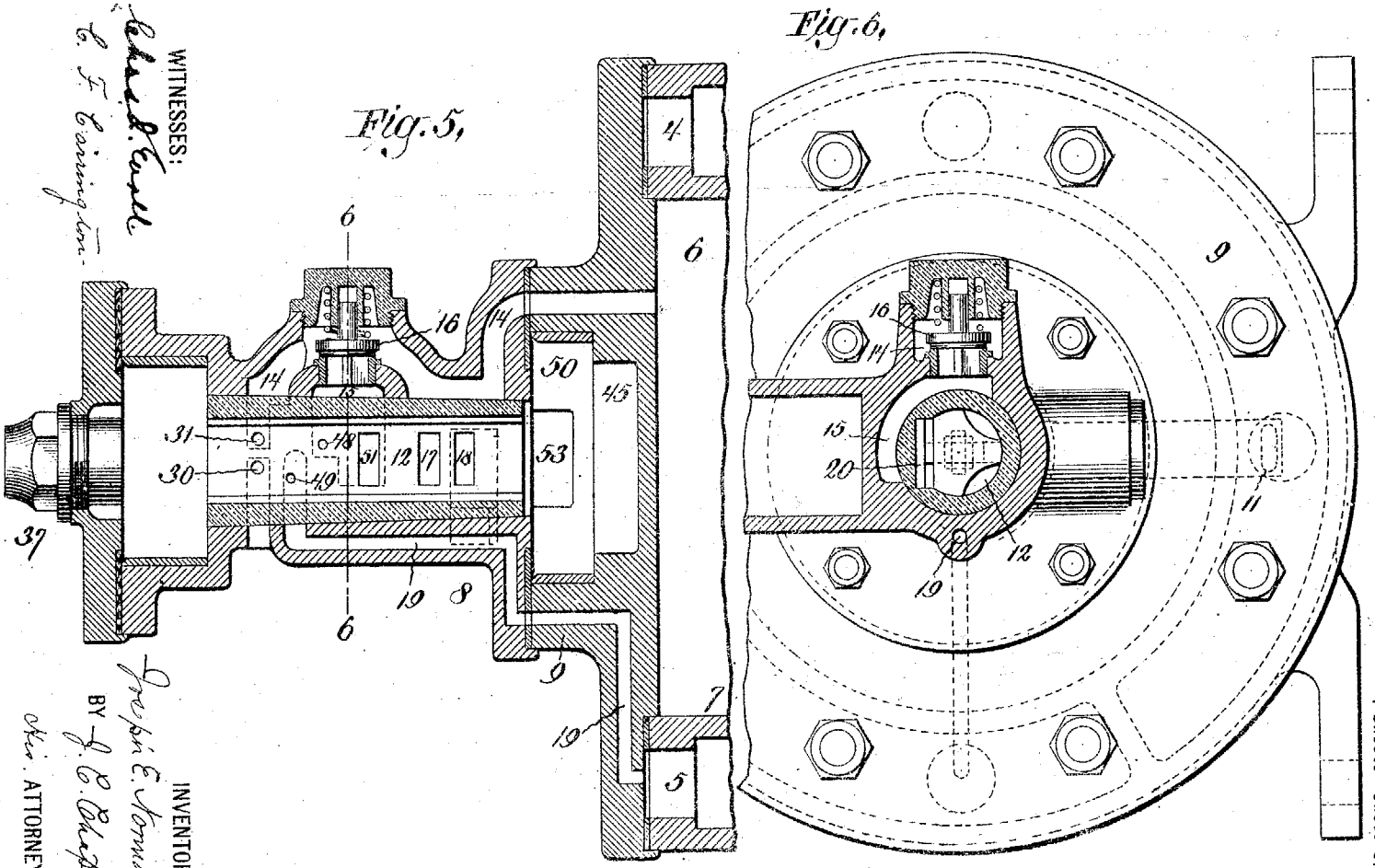
WITNESSES:
Chas. D. Earll
C. F. Carrington
INVENTOR
Joseph E. Normand
BY J. C. Chapin
Atty. ATTORNEY No. 12,047. Reissued Oct. 28, 1902.

J. E. NORMAND.

AIR BRAKE.

(Application filed Nov. 23, 1900.)

4 Sheets—Sheet 4.

running service full service emergency partial release

Witnesses:
Edward Hall
C. F. Carrington

Joseph E. Normand Inventor
By his Attorney J. C. Chapin

UNITED STATES PATENT OFFICE.

JOSEPH E. NORMAND, OF HOBOKEN, NEW JERSEY, ASSIGNOR OF ONE-HALF TO JOSEPH R. ELLICOTT, OF NYACK, NEW YORK, AND CHARLES A. BALL, OF BROOKLYN, NEW YORK.

AIR-BRAKE.

SPECIFICATION forming part of Reissued Letters Patent No. 12,047, dated October 28, 1902.

Original No. 660,650, dated October 30, 1900. Application for reissue filed November 23, 1900. Serial No. 37,543.

*To all whom it may concern:*

Be it known that I, JOSEPH E. NORMAND, a citizen of the United States of America, and a resident of Hoboken, in the county of Hudson and State of New Jersey, have invented certain new and useful Improvements in Air-Brakes, of which the following is a specification.

My invention relates to improvements in air-brakes, and particularly to improvements in such system of air-brakes as is known as the "automatic" system, in which brakes are applied or released under the control of a so-called "triple valve" operated under conditions or variations in pressure in a train-pipe.

My invention consists in improvements in the construction and operation of a triple-valve mechanism, in the employment of an auxiliary reservoir in combination with a service-reservoir, in an improved form of combined service-reservoir, reinforcing-reservoir, and brake-cylinder, and in certain novel and improved forms and details of construction and combination of parts, as shall hereinafter be more fully described.

I will now proceed to describe an air-brake mechanism embodying my invention and will then point out the novel features in claims.

In the drawings, Figure 1 is a diagrammatic view of such portions of an air-brake system as are necessary to the clear understanding of my invention. Fig. 2 is a central vertical section through my improved combined service-reservoir, emergency-reservoir, and brake-cylinder, but with one of the heads thereof removed. Fig. 3 is a transverse section of the same. Fig. 4 is a central vertical section through the triple-valve mechanism and the cylinder-head to which it is secured, said cylinder-head being the one which is removed from Fig. 2, showing also a small portion of the reservoirs and brake-cylinder. Fig. 5 is a central horizontal section of the same. Fig. 6 is a transverse section on the line 6 6 of Fig. 5. Fig. 7 is a detail face view of an emergency-valve employed. Fig. 8 is a detail face view of a graduation-valve employed. Fig. 9 is a detail sectional view illustrating a slight modification in which the local train-pipe exhaust is to the atmosphere. Figs. 10, 11, 12, 13, and 14 are a series of diagrammatic views illustrating the various positions of the emergency and graduation valves with their respective ports under different conditions of train-pipe pressure.

Similar reference characters designate corresponding parts in all the figures.

Reference character 1 designates the train-pipe; 2, the engineer's valve; 3, the main reservoir. All of these are too well known to require detail illustration or description, and are shown merely diagrammatically in Fig. 1 to show their relationship to other parts constituting this invention. They may be of any desired or well-known form.

Referring now more paaticularly to Figs. 2 and 3, reference character 4 designates a service or auxiliary reservoir—that is to say, auxiliary to the main reservoir 3. 5 designates what I term a "reinforcing-reservoir," and 6 a brake-cylinder. I preferably make and have so shown the service-reservoir, reinforcing-reservoir, and brake-cylinder in one casting, the service and auxiliary reservoirs surrounding the brake-cylinder and separated or divided from each other by longitudinal diaphragms $5^a$. (See particularly Fig. 3.) The construction of the reservoirs and cylinder in this manner forms an exceedingly compact and desirable arrangement, entirely doing away with all pipe connections except that of the train-pipe. I have designated the combined reservoirs and cylinder as a whole by the reference character 7.

Reference character 8 designates the triple valve as a whole. The said triple valve is shown clearly and in detail in Figs. 4, 5, and 6, to which reference is now more particularly made.

Reference character 9 designates a head or cover for the combined reservoirs and brake-cylinder, and to this cover is preferably secured the casing of the triple valve 8, as shown. The train-pipe 1 is connected to the said valve-casing and communicates with the chamber $1^a$.

10 designates an emergency-piston mounted for the sake of convenience within a cylindrical bore 50, provided within the head or cover 9. In this cover is also arranged a port 11, which communicates with the service-reservoir and a chamber 45 behind the emergency-piston. The space inclosed by the partially-cylindrical bore of the triple-valve casing and in which the emergency-valve 20 and the graduation-valve 26, to be hereinafter more fully described, are arranged to reciprocate is designated by the reference character 12. A small port 13 is arranged in the emergency-piston 10, whereby air from the service-valve is allowed to flow into the space 12. As will be seen more clearly in Fig. 5, the head or cover 9 is further provided with a port forming part of a passage 14, which leads from the brake-cylinder to a brake-cylinder space 15. (See Figs. 4, 5, and 6.) A valve 16 is arranged in the passage 14, spring-closed to prevent the flow of air from the brake-cylinder to the passage 15, but adapted to permit the passage of air from the said space to the brake-cylinder.

17 designates a port in open communication with the train-pipe, and 18 is a port opening from the interior space 12 to a discharge-passage 42, to be hereinafter described.

19 designates a passage in open communication with the reinforcing-reservoir, the said passage passing through the casing of the triple valve 8 and the head or cover 9, as seen more clearly by reference to Fig. 5.

20 designates the before-mentioned emergency-valve, a face view of which is shown in Fig. 7, in which view the valve is shown removed from its casing. The said valve has a passage 21, which when in correct relative position therewith forms a crossover-port, joining ports 17 18. The said passage 21 may be termed an "emergency-passage," as it is only used for an emergency stop, as will presently be explained.

22 designates the emergency service-reservoir port and which is adapted to register with the emergency-port 51, communicating with the passage 15.

Reference character 23 designates a post or stem preferably and here shown as integral with the valve 20. In the closed or "running" position of the valve, in which position it is shown in Fig. 4, the said stem bears against a pin 24, mounted in the valve-casing, and by reason of the inclined face of the stem causes the valve to be held firmly seated. Such means might be necessary when "releasing," the train-pipe at such time being under greater pressure than the service-reservoir. Any tendency of the air to leak up under valve 20 will thus be obviated.

25 designates a spring acting to return the piston 10 and emergency-valve 20 to normal running position.

35 designates a pin by which the valve 20 is secured to the stem of the piston 10. The pin is a loose fit and permits a small relative movement, whereby the valve is permitted to seat itself.

26 is the graduating-valve, a detail face view of which is shown in Fig. 8. It has a crossover exhaust-port 27, reinforcing-port 28, and equalizing feed-port 29.

30 designates a port in the triple-valve casing leading from the interior thereof to the outer atmosphere, and 31 designates a port leading from the interior of the casing to the brake-cylinder through the port 14. When in running position, the crossover-port 27 connects the two ports 30 31 and holds the brake-cylinder open to the atmosphere. At such time also the equalizing feed-port 29 is opposite a port 49 in the casing which communicates with the reinforcing-reservoir through the passage 19. The effect of this is to maintain a balance of pressure between the reinforcing-reservoir and the service-reservoir.

32 designates a graduation-piston mounted in a suitable cylindrical extension of the valve-casing, as shown. The valve 26 is arranged between two lugs $32^a$ $32^b$ of the piston-stem, and hence partakes of its movement. A spring 33, secured to a pin 34 upon the valve, keeps the said valve up to its seat.

36 designates a spring mounted in the head 37 of the triple valve and against which a projection $32^c$ of the piston 32 is adapted to bear when moved in an opposite direction to that in which it is shown in Fig. 4. A completion of the movement in such direction will compress the spring 36, which will then have a tendency to force the piston 32, and with it the valve 26, in the opposite direction. The strength of the spring 36 is arranged to be such that when the service-reservoir 4 and the brake-cylinder 6 have equalized the said spring shall act to move the said piston 32 back again a limited distance. This spring-stop or its equivalent is desirable, though not absolutely essential, as by a proper manipulation of the engineer's valve the operator could cause the movement of the piston 32 to be limited precisely as desired.

A piston 38, with tubular valve-stem guided through a head or cover 39, is shown within the brake-cylinder, (see Fig. 2,) and a spring 40, arranged to return the said piston to its normal position, in which position it is illustrated in Fig. 2. It is understood that to "set" the brakes air under pressure is admitted into the brake-cylinder between the head or cover 9 and the piston 38, and the spring 40 is compressed by the movement of the piston. Then the brakes are released upon the exhaust of air from the cylinder and the return of the piston by the spring 40. Further description of this or illustration of the brakes proper, the equalizing system of levers, foundation-rigging, &c., is unnecessary, as being well known and forming no part of this invention.

Referring back now to the discharge-passage 42 before mentioned, it will be noted by reference to Fig. 4 of the drawings that the said passage communicates with the service-reservoir port 11 through check-valve 41 and port 43. The said check-valve prevents the discharge of air from the service-reservoir; but at such times as the crossover-passage 21 of the valve 20 is opposite the ports 17 and 18 the air from the train-pipe will discharge toward the said service-reservoir through 17 21 18 42 41 43 and will mingle with the air flowing through 45, 50, and 12, and thus into the brake-cylinder. A light spring may be used to return the valve 41 to its seat; but such spring is not considered necessary and is not shown.

Figure 11:
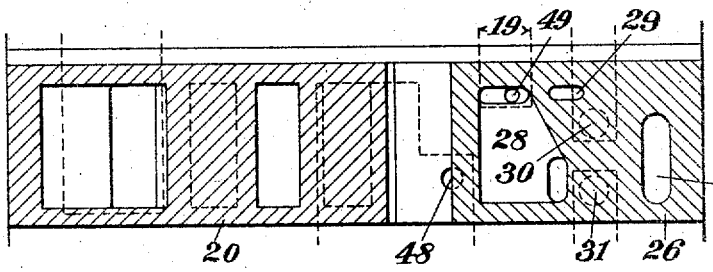
Figure 12:
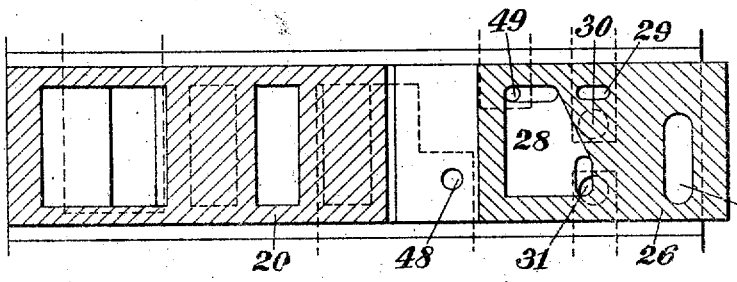
Figure 13:
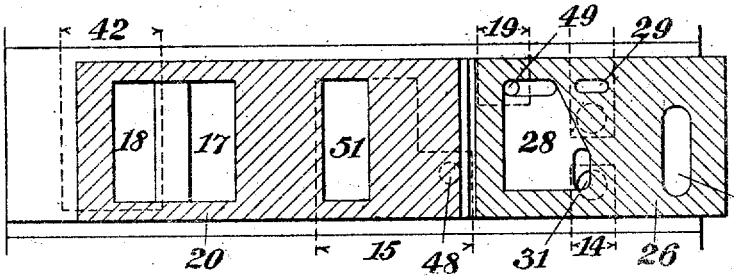
Figure 14:
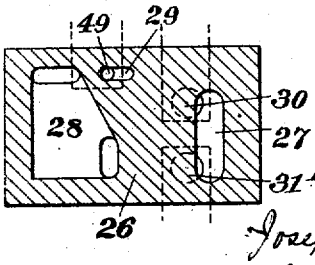

The operation of the device is as follows: The normal position of the parts is as illustrated in Figs. 3 to 10, inclusive. Air under pressure is in the train-pipe, the service-reservoir, and the reinforcing-reservoir. All three are equalized. The reinforcing and the service reservoir are equalized through 11 45 13 50 12 29 49 19. The train-pipe is equalized therewith through a small port 47, which permits air to leak past the piston 32, which port is the feed-port for the service and reinforcing reservoirs. The brake-cylinder 6 is open to the atmosphere through 14 31 27 30, while the ports 48 and 51, which lead from the valve-chamber 12 to the brake-cylinder through 16, 15, and 14, are closed by the valves 26 and 20, respectively. If now it be desired to apply the brakes for an ordinary service stop, the requisite quantity of air will be vented from the train-pipe 1, which will bring the pressure in the said train-pipe below the pressure in the service-reservoir and in the valve-chamber 12. This will cause the graduation-piston 32 to move outwardly from its normal position, first cutting off feed-port 47. The graduation-valve 26 moves with the piston 32 and the first movement thereof will close ports 30 and 31, thereby shutting off brake-cylinder exhaust. Further movement of the same uncovers the service-port 48, which communicates from the valve-chamber 12 to the passage 15, permitting air to flow from the service-reservoir into the brake-cylinder. While this is taking place, the port 49 is closed by the valve 26 and the reinforcing-reservoir is closed from communication with the valve-chamber 12, and hence from the service-reservoir. The position of the parts is now as illustrated in Fig. 11 of the drawings. The parts remain in this position until the pressure in the service-reservoir falls below that of the train-pipe. The graduation piston and valve therewith will then return toward their normal position and about to such position as shall cause further flow of air from the service-reservoir to be prevented. The pressure already in the said brake-cylinder may be maintained, however, as long as desired. By venting a small quantity more air from the train-pipe the graduation-valve may now be moved outwardly to increase the brake-pressure, or by slightly recharging the train-pipe the graduation-valve may be moved till the ports 30 31 are partially in communication through port 27 in the valve 26 and the air in the brake-cylinder allowed to leak slowly to the atmosphere. Fig. 14 illustrates the parts in this position. When the parts are in this position, the air will leak but very slowly from the brake-cylinder to the atmosphere, resulting in a gradual decrease of pressure in the brake-cylinder. At the same time ports 29 and 49 are brought into communication and air flows from the reinforcing-reservoir to chamber 12. This flow of air from the reinforcing-reservoir will raise the pressure in chamber 12 above that in the train-pipe, and the piston 32, with valve 27, will be moved outwardly until the pressures in chamber 12 and the train-pipe are equalized or to a position where the valve cuts off communication between chamber 12 and the reinforcing-reservoir and closes the brake-cylinder exhaust. When the valve is in this position, in order to again move the valve to the position of Fig. 14, and thus open the brake-cylinder to the exhaust, it is necessary to slightly increase the pressure in the train-pipe until it rises above that in the service-reservoir, when the valve will return to the position illustrated by that figure and the operation already described will be repeated. A still further slight increase of pressure in the train-pipe will cause a still further momentary exhaust from the brake-cylinder, and a repetition will result in a gradual release of the brakes. When the parts are in the position shown in Fig. 14 and the brake-cylinder is partially opened to the exhaust, such leak may also be quickly stopped by venting air from the train-pipe. The engineer is thus enabled to grade his brake-pressure up and down at will by venting a small quantity of air from or into the train-pipe at the engineer's valve. For a full service stop the engineer will vent the train-pipe below the service-reservoir pressure after the air in the said service-reservoir has been entirely expanded into the brake-cylinder and the said brake-cylinder and service-reservoir have been equalized. This will cause the graduation-piston 32 to complete its full stroke, compressing the spring 36 and bringing into communication ports 49 and 31 through valve-port 28. Air from the reinforcing-reservoir will now flow into the brake-cylinder through 19, 49, 28, 31, and 14, closing valve 16 and augmenting that which has already flowed from the service-cylinder through 11, 45, 13, 50, 12, 48, 15, 16, and 14, and the brakes may then be gradually released, as above described. For an emergency stop the engineer will release quickly a large quantity of air from the train-pipe. This will cause a great preponderance of pressure against emergency-piston 10, and the small port 13 therein will not be large enough to permit such volume to rush therethrough to supply the depletion of air in the valve-chamber 12 quickly enough. Hence the emergency-piston will be driven quickly to the right (in the drawings) and the comparatively large emergency-port 22 in the valve 20 will be brought opposite the large port 51 to permit a quick rush of air through passage 15 to the brake-cylinder. At the same time the cross-over-port 21 of the valve 20 will be brought opposite the ports 17 and 18, and any preponderance of pressure in the train-pipe will be exhausted into the valve-chamber 12, and hence equalized with the service-reservoir and the brake-cylinder through 17, 21, 18, 42, 41, 43, 11, 45, 50, and 12. The cylindrical bore has a cut-away portion 53, which permits the air to pass freely around the piston 10 from the chamber 45 into the cylindrical bore 50 when said piston is moved outwardly. In the meanwhile the graduation-piston is of course out as far as it will go and the reinforcing-reservoir is in communication with the brake-cylinder by reason of ports 49 and 31 being opposite the valve-port 28. After the service-reservoir brake-cylinder and train-pipe have all been equalized the emergency-piston will quickly return to its normal position, the action of the spring 25 being such as to insure this, and the spring 36 will partially return the graduation-piston and valve, so that ports 49 and 31 are out of register with the valve-port 28 and the reinforcing-reservoir is cut off. The emergency-piston having returned to its normal position, the ports 17 and 18 are closed by the emergency-valve and the train-pipe will be closed with a pressure therein equal to that in the service-reservoir and brake-cylinder, which in fully-expanded condition would ordinarily be about forty pounds to the square inch.

Should an accident occur and the train-pipe be broken, the check-valve 41 would prevent the air from the service-reservoir discharging into the train-pipe while the ports 17 and 18 are in communication.

By reference to Fig. 9 it will be seen that, if desired, I may open the discharge-passage 42 directly to the atmosphere through port 44 instead of connecting same with port 43. The connection shown in Fig. 4, however, is preferable, as in case of emergency any excess of pressure in the train-pipe is utilized for braking purposes.

I may of course, if desired, use certain parts of my invention without others. For instance, I may, if I so desire, use my improvements in the triple-valve mechanism without using the reinforcing-reservoir, and numerous modifications of my several improved devices may be resorted to without departing from the spirit and scope of my invention.

Having now particularly described and ascertained the nature of my said invention and in what manner the same is to be performed, I declare that what I claim is—

1. In an air-brake system the combination with a brake-cylinder, a train-pipe, a service-reservoir and a reinforcing-reservoir, of an automatic valve mechanism, adapted under variations of pressure in the train-pipe, first, to permit free communication between said service-reservoir and said reinforcing-reservoir in either direction under normal or running conditions; secondly, to close communication to or from said reinforcing-reservoir and to open communication between said service-reservoir and said brake-cylinder, under ordinary service-stop conditions; and thirdly, to open communication between both said reservoirs and said brake-cylinder under full service-stop conditions.

2. In an air-brake system the combination with a brake-cylinder, a train-pipe, a service-reservoir and a reinforcing-reservoir, of an automatic valve mechanism, adapted under variations of pressure in the train-pipe, first, to permit free communication between said service-reservoir and said reinforcing-reservoir in either direction under normal or running conditions; secondly, to close communication to or from said reinforcing-reservoir and to open communication between said service-reservoir and said brake-cylinder, under ordinary service-stop conditions; thirdly, to open communication between both said reservoirs and said brake-cylinder under full service-stop conditions, and fourthly, to open communication between the service-reservoir and the brake-cylinder through a large or emergency port under emergency conditions.

3. In an air-brake system the combination with a brake-cylinder, a train-pipe, a service-reservoir and a reinforcing-reservoir, of a valve, a valve-chamber, ports leading from said valve-chamber to the service-reservoir, to the reinforcing-reservoir, to the brake-cylinder, and to an exhaust, said valve adapted, when in its position at one end of its stroke to open communication between the ports leading from the valve-chamber to the service-reservoir, and to the reinforcing-reservoir, to close the port leading from the valve-chamber to the brake-cylinder, and to put in communication ports leading to the brake-cylinder and to the exhaust, when in an intermediate position, to open communication between ports leading from the valve-chamber to the service-reservoir and to the brake-cylinder, to close the port leading from the reinforcing-reservoir and to close the port leading to the exhaust, and when in its position at the opposite end of its stroke to open in addition to the ports opened when in an intermediate position, the port leading from the interior of the valve-chamber to the reinforcing-reservoir, whereby the reinforcing-reservoir is put in communication with the brake-cylinder, and means for operating said valve.

4. In an air-brake system the combination with a brake-cylinder, of an outer casing surrounding same, the space between the outer casing and the brake-cylinder divided into two chambers by a diaphragm arranged longitudinally thereof, the said chambers being adapted to be used as reservoirs for air under pressure.

5. In an air-brake system the combination with a brake-cylinder, a train-pipe, a service-reservoir, a reinforcing-reservoir and a valve-chamber, ports leading from said valve-chamber to the service-reservoir and to the reinforcing-reservoir, a service-port leading from the valve-chamber to the brake-cylinder, an emergency-port of larger size leading from the valve-chamber to the brake-cylinder, and a port connecting the brake-cylinder with the exhaust, of a valve adapted, first, to put in communication the ports leading to the service-reservoir and to the reinforcing-reservoir, to close the service-port from the valve-chamber to the brake-cylinder and to open the port connecting the brake-cylinder with the exhaust; secondly, to put in communication the port leading to the service-reservoir and the service-port leading to the brake-cylinder, to close the port leading from the valve-chamber to the reinforcing-reservoir and to close the port connecting the brake-cylinder with the exhaust; and thirdly, to open, in addition to the ports opened by the said valve under said second conditions, the port leading from the valve-chamber to the reinforcing-reservoir, whereby the said port is put into communication with the brake-cylinder; and an emergency-valve, adapted to open the said emergency-port.

6. In an air-brake system the combination with a brake-cylinder, a train-pipe, a service-reservoir and a reinforcing-reservoir, of a valve mechanism arranged to govern communication between the service-reservoir, the reinforcing-reservoir and the brake-cylinder, and an emergency-valve arranged to govern communication between the service-reservoir and the brake-cylinder, and at the same time to govern communication between the train-pipe and the discharge-passage.

7. In an air-brake system the combination with a brake-cylinder, a train-pipe, a service-reservoir and a reinforcing-reservoir, of a valve mechanism arranged to govern communication between the service-reservoir, the reinforcing-reservoir and the brake-cylinder, and an emergency-valve arranged to govern communication between the service-reservoir and the brake-cylinder, and at the same time to govern communication between the train-pipe and a discharge-passage leading to the brake-cylinder.

8. In an air-brake system the combination with a brake-cylinder, a train-pipe, a service-reservoir and a reinforcing-reservoir, of a valve, a valve-chamber, ports leading from said valve-chamber to the service-reservoir, to the reinforcing-reservoir, to the brake-cylinder, and to an exhaust, said valve adapted, when in its position at one end of its stroke to open communication between the ports leading from the valve-chamber to the service-reservoir, and to the reinforcing-reservoir, to close the port leading from the valve-chamber to the brake-cylinder, and t put in communication ports leading to the brake-cylinder and to the exhaust, when in an intermediate position to open communication between ports leading from the valve-chamber to the service-reservoir and to the brake-cylinder, to close the port leading from the reinforcing-reservoir and to close the port leading to the exhaust, and when in its position at the opposite end of its stroke to open, in addition to the ports opened when in an intermediate position, the port leading from the interior of the valve-chamber to the reinforcing-reservoir, whereby the reinforcing-reservoir is put in communication with the brake-cylinder, and an impositive stop limiting, against spring-pressure, the movement of the valve beyond its intermediate position, and means for operating said valve.

9. The combination in a valve mechanism with a casing, a piston, and a graduating and releasing valve controlled by the movement of said piston, said valve arranged to govern communication between an air-reservoir and a brake-cylinder, and the brake-cylinder and an exhaust, respectively, of a piston, mounted and arranged to move independently of said first-mentioned piston and an emergency-valve controlled by the movement of said last-named piston, the movement of said emergency-valve being adapted, mechanically, to force the movement of said first-mentioned valve in one direction.

10. The combination in a valve mechanism with a casing, a piston and a graduating and releasing valve controlled by the movement of said piston, said valve arranged to govern communication between an air-reservoir and a brake-cylinder, and the brake-cylinder and an exhaust, respectively, of a piston mounted and arranged to move independently of said first-mentioned piston, an emergency-valve controlled by the movement of said last-named piston, the movement of said emergency-valve being adapted, mechanically, to force the movement of said first-mentioned valve in one direction, and a spring for returning the said last-named piston to its normal position.

11. The combination in a valve mechanism of a valve-casing, a valve-chamber, a graduating and releasing valve arranged in said chamber and controlling ports leading to an air-reservoir, a brake-cylinder and an exhaust, a graduation-piston open on one side to said chamber and on the other to a train-pipe, an emergency-valve, and an emergency-piston, adapted to control in its movements the movements of the said emergency-valve, said emergency-piston being open on one side to the said valve-chamber and on the other side to the said reservoir.

12. The combination in a valve mechanism of a valve-casing, a valve-chamber, a graduating and releasing valve arranged in said chamber and controlling ports leading to an air-reservoir, a brake-cylinder and an exhaust, a graduation-piston arranged at one end of said chamber and open on one side to said chamber and on the other to a train-pipe, an emergency-valve also mounted in said valve-chamber, and an emergency-piston arranged at the opposite end of said chamber and open on one side to the said chamber and on the other side to the said reservoir.

13. In an air-brake system the combination with a train-pipe, an air-reservoir and a brake-cylinder, of a valve mechanism including a valve-casing, a valve-chamber, a graduating and releasing valve arranged in said chamber and controlling ports leading to the air-reservoir, the brake-cylinder and an exhaust, a graduation-piston open on one side to said chamber, and on the other to the train-pipe, an emergency-valve also mounted in said chamber, and an emergency-piston mounted in a cylindrical bore in a head of the air-reservoir, and open on one side to said reservoir and on the other to said valve-chamber.

14. In an air-brake system the combination with a service-reservoir and a reinforcing-reservoir combined, a train-pipe and a brake-cylinder, of a triple-valve device including a valve-chamber, a graduating and releasing valve arranged in said valve-chamber, and controlling ports leading to the service-reservoir, the reinforcing-reservoir, the brake-cylinder and an exhaust, a graduation-piston, open on one side to said chamber and on the other to said train-pipe, an emergency-valve also mounted in said chamber, and an emergency-piston mounted in a cylindrical bore in a head of the combined service and reinforcing reservoirs, said emergency-piston being open on one side to the service-reservoir and on the other to the valve-chamber.

15. In an air-brake system the combination with a service-reservoir, a reinforcing-reservoir, a train-pipe and a brake-cylinder, of a valve mechanism including a valve-chamber, a graduating and releasing valve controlling ports leading to the service-reservoir, the reinforcing-reservoir, the train-pipe and an exhaust, a graduation-piston open on one side to the said valve-chamber and on the other side to the train-pipe, an emergency-valve controlling an emergency-port and a communication between the train-pipe and a discharge-passage, and an emergency-piston open on one side to the said valve-chamber and on the other side to the service-reservoir.

16. In an air-brake system the combination with a service-reservoir, a reinforcing-reservoir, a train-pipe and a brake-cylinder, of a valve mechanism including a valve-chamber, a graduating and releasing valve controlling ports leading to the service-reservoir, the reinforcing-reservoir, the train-pipe and an exhaust, a graduation-piston open on one side to the said valve-chamber and on the other side to the train-pipe, an emergency-valve controlling an emergency-port and a communication between the train-pipe and a discharge-passage, an emergency-piston open on one side to the said valve-chamber and on the other side to the service-reservoir, and a communication between the said train-pipe discharge-passage and that side of the emergency-piston which is open to the service-reservoir.

17. In an air-brake system the combination with a service-reservoir, a reinforcing-reservoir, a train-pipe and a brake-cylinder, of a valve mechanism including a valve-chamber, a graduating and releasing valve controlling ports leading to the service-reservoir, the reinforcing-reservoir, the train-pipe and an exhaust, a graduation-piston open on one side to the said valve-chamber and on the other side to the train-pipe, an emergency-valve controlling an emergency-port and a communication between the train-pipe and a discharge-passage, an emergency-piston open on one side to the said valve-chamber and on the other side to the service-reservoir, a communication between the said train-pipe discharge-passage and that side of the emergency-piston which is open to the service-reservoir, and a non-return check-valve arranged in said last-named passage.

18. In an air-brake system the combination with a brake-cylinder, a train-pipe, a service-reservoir and a reinforcing-reservoir of an automatic valve mechanism containing means whereby the service-reservoir may receive fluid from the reinforcing-reservoir during a position of the valve giving partial exhaust to the brake-cylinder.

19. In an air-brake system the combination with a brake-cylinder, a train-pipe, a service-reservoir and a reinforcing-reservoir of an automatic valve mechanism containing means whereby the service-reservoir may receive fluid from the reinforcing-reservoir during a position of the valve giving partial exhaust to the brake-cylinder and prior to the opening of the reservoir-charging port from the train-pipe.

20. In an air-brake system the combination with a brake-cylinder, a train-pipe, a service-reservoir and a reinforcing-reservoir of an automatic valve mechanism adapted under variations of pressure in the train-pipe to permit under normal running conditions free communication between the service-reservoir, the reinforcing-reservoir and the train-pipe, under braking conditions communication between the service-reservoir and the brake-cylinder, while closing communication between the service and the reinforcing reservoirs and between the service-reservoir and the train-pipe, and under partial release conditions to permit communication between the service and the reinforcing reservoirs while maintaining the service-reservoir closed to the train-pipe.

21. In an air-brake system the combination with a brake-cylinder, a train-pipe, a service-reservoir and a reinforcing-reservoir of an automatic valve mechanism adapted under variations of pressure to permit under one condition free communication between the service-reservoir, the reinforcing-reservoir and the train-pipe, under another condition, free communication between the service-reservoir and the brake-cylinder, while closing communication with the reinforcing-reservoir, and under another condition to admit air from the reinforcing-reservoir to the brake-cylinder to augment the air already expanded from the service-reservoir into the brake-cylinder, but preventing air from the reinforcing-reservoir from expanding into the service-reservoir.

22. In an air-brake system the combination with a brake-cylinder, a train-pipe, a service-reservoir and a reinforcing-reservoir of an automatic valve mechanism containing means whereby the service-reservoir may receive fluid from the reinforcing-reservoir during a position of the valve giving partial exhaust to the brake-cylinder and the valve be actuated to close said exhaust.

23. In an air-brake system, the combination with a brake-cylinder, a train-pipe, a service-reservoir and a reinforcing-reservoir, of a valve, a valve-chamber in communication with the service-reservoir, ports leading from the valve-chamber to the reinforcing-reservoir, to the brake-cylinder, and to the exhaust, said valve adapted, when in its position at one end of its stroke, to open the port leading from the valve-chamber to the reinforcing-reservoir, to close the port leading from the valve-chamber to the brake-cylinder, and to put in communication ports leading to the brake-cylinder and to the exhaust; when in an intermediate position, to open the port leading from the valve-chamber to the brake-cylinder, to close the port leading from the reinforcing-reservoir and to close the port leading to the exhaust; and when in its position at the opposite end of its stroke to open in addition to the ports opened when in an intermediate position, the port leading from the interior of the valve-chamber to the reinforcing-reservoir, whereby the reinforcing-reservoir is put in communication with the brake-cylinder, and means for operating said valve.

24. In an air-brake system, the combination with a brake-cylinder, a train-pipe, a service-reservoir and a reinforcing-reservoir, of a valve, a valve-chamber in communication with the service-reservoir, ports leading from the valve-chamber to the reinforcing-reservoir, to the brake-cylinder, and to the exhaust, said valve adapted, when in its position at one end of its stroke, to open the port leading from the valve-chamber to the reinforcing-reservoir, to close the port leading from the valve-chamber to the brake-cylinder and to put in communication ports leading to the brake-cylinder and to the exhaust; when in an intermediate position, to open the port leading from the valve-chamber to the brake-cylinder, to close the port leading from the reinforcing-reservoir and to close the port leading to the exhaust; and when in its position at the opposite end of its stroke to open in addition to the ports opened when in an intermediate position, the port leading from the interior of the valve-chamber to the reinforcing-reservoir, whereby the reinforcing-reservoir is put in communication with the brake-cylinder, and an impositive stop, limiting, against spring-pressure, the movement of the valve beyond its intermediate position, and means for operating said valve.

25. In a fluid-pressure-brake system, the combination with a train-pipe, a brake-cylinder, a service-reservoir, and a reinforcing-reservoir of an automatic valve mechanism and a movable abutment adapted to operate the valve according to the variations of the pressure in the train-pipe, so that communication from the reinforcing-reservoir is closed when the valve is in an intermediate position, said abutment being exposed on one side to train-pipe pressure and on the other side to pressure from the service-reservoir and the reinforcing-reservoir when the valve is in its release position.

26. In a fluid-pressure-brake system, the combination of a train-pipe, a brake-cylinder, a service-reservoir, a reinforcing-reservoir, a valve-chamber in communication with the service-reservoir, a valve, a movable abutment for operating the valve according to variations of pressure in the train-pipe, and a port leading from the reinforcing-reservoir to the valve-chamber and adapted to be opened when the valve is moved to "release" position and closed when the valve is at an intermediate position.

27. In a fluid-pressure-brake system, the combination with a train-pipe, a brake-cylinder, a service-reservoir and a reinforcing-reservoir, of an automatic valve mechanism operated by variations of the pressure in the train-pipe, said valve adapted to open communication from the service-reservoir to the reinforcing-reservoir when in "release" position and also when in "emergency" position, and to close communication from the reinforcing-reservoir when in an intermediate position.

28. In a fluid-pressure-brake system, the combination of a train-pipe, a brake-cylinder, a service-reservoir, a reinforcing-reservoir, a valve-chamber communicating with the service-reservoir, a valve, a movable abutment operated by variations in the train-pipe pressure for moving said valve to open communication from the service-reservoir to the brake-cylinder and to close communication from the reinforcing-reservoir, when the valve is in an intermediate position, and to open communication from the reinforcing-reservoir to the valve-chamber when the valve is returned to release position.

In testimony whereof I have signed my name to this specification in the presence of two subscribing witnesses.

JOSEPH E. NORMAND.

Witnesses:

CHAS. J. EARLL,
C. F. CARRINGTON.